Jan. 11, 1927.
E. D. WORDEN
1,613,778
AUTOMATIC BRAKE BAND ADJUSTING DEVICE
Filed August 24, 1926
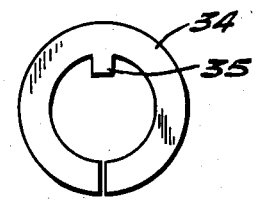
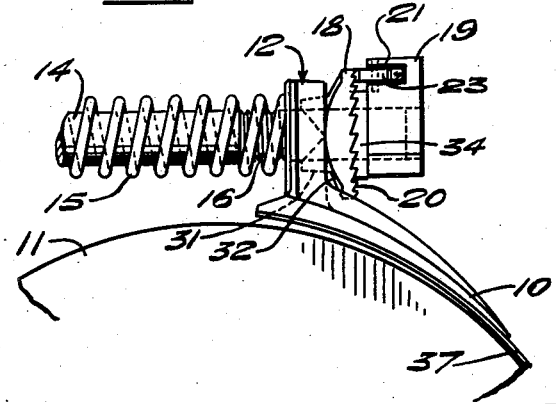
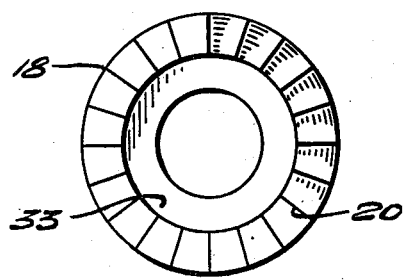
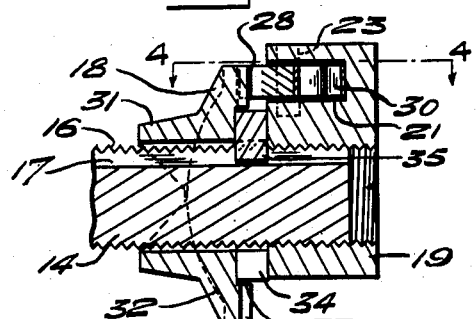
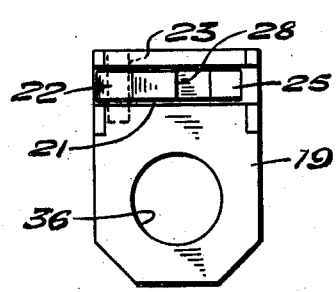
Inventor
Erle D. Worden
By Watson E. Coleman
Attorney Patented Jan. 11, 1927.

1,613,778

UNITED STATES PATENT OFFICE.

ERLE D. WORDEN, OF TULSA, OKLAHOMA, ASSIGNOR OF ONE-HALF TO ORLANDO HALLIBURTON, OF TULSA, OKLAHOMA.

AUTOMATIC BRAKE-BAND-ADJUSTING DEVICE.

Application filed August 24, 1926. Serial No. 131,297.

This invention relates to automatic brake band adjusting devices and more particularly to a device of this character for use with the brake bands controlling the drums of planetary transmissions.

An important object of the invention is to produce a device of this character which may be cheaply manufactured and free from portions which are liable to become loosened and fall into the transmission where they may cause damage.

A further and more specific object of the invention is to provide a pawl and ratchet device automatically taking up on the band when the operating shaft thereof has an effective operation beyond a predetermined point, thus preventing the band from becoming loosened, which embodies pawl and ratchet mechanism in which the spring controlling operation of the pawl is so housed that the possibility of breakage thereof is reduced and the probability of any portion of the spring escaping into the transmission mechanism, even if broken, is reduced to a minimum.

A still further object of the invention is the provision of a device of this character so constructed as to allow free play of the brake drum.

These and other objects I attain by the construction shown in the accompanying drawings, wherein for the purpose of illustration is shown a preferred embodiment of my invention and wherein:—

Figure 1 is a fragmentary sectional view of the operating shaft and band of a brake drum showing the operating shaft and band connected by an automatic adjusting device constructed in accordance with my invention;

Figure 2 is a vertical sectional view therethrough;

Figure 3 is a view of the outer face of the member stationary with relation to the band;

Figure 4 is a section on the line 4—4 of Figure 2;

Figure 5 is an inner face view of the nut;

Figure 6 is a view of the washer employed;

Figure 7 is a fragmentary sectional view showing the relative positions of the shaft and ear.

Referring now more particularly to the drawings, the numeral 10 generally designates a brake band coacting with a brake drum 11. This band embodies spaced ears 12, one of which is disclosed herein and these ears are notched, as at 13, for the passage of a control shaft 14 which is rocked to cause clamping of the band upon the drum through the medium of a cam (not herein disclosed). A spring 15 surrounds the shaft and extends between the ears 12 to maintain the same in separated relation, except when they are drawn together by operation of the shaft 14. The shaft 14 is usually provided with a threaded outer end 16 having a longitudinally extending keyway 17. The parts hereinbefore described all form normal parts of a well known braking system employed in planetary transmissions and form no part of my invention, except in combination with the structure hereinafter described.

In accordance with my invention, I provide two members 18 and 19, one of which is stationary with relation to the coacting ear 12 and the other of which is normally stationary with relation to the shaft 14. One of these members is formed in its face with ratchet teeth 20, while the opposite member is formed with a slot 21 which is perpendicular to a radius of the shaft and within which is located a pawl 22 upon a pivot 23 offset to one side of the radius perpendicular to the walls of the slot. This pawl is L-shaped and has its longer arm 24 engaged at its end with the pivot 23, while the shorter arm 25 extends into the slot. At the heel or exterior angle between the arms, the body is rabbetted at 27 to produce a ratchet lug 28 for engagement with the ratchet teeth 20. Between the inner or vertical wall 29 of the slot and the long arm 24 of the dog, a U-shaped spring 30 is disposed, which constantly urges the dog outwardly to maintain its proper engagement with the teeth 20.

In the present instance, the member stationary with relation to the ear is shown as hacing an axial extension 31, the side walls of which taper toward one another at the free end of the extension and are flat for engagement between adjacent faces of the arms 12ª produced in the ear by notch 13. The arm confronting faces of the member 18 are arcuately curved, as indicated at 32, so that during movement of the ear, they will constantly bear thereagainst at a point as nearly adjacent the vertical center of the ear as possible and thus apply the strain thereto at the proper point. The tapering of the side walls of the extension permits adaptation of the member 18 to the ears in a convenient manner not possible where any attempt is made to have this extension fit snugly between the side walls of the notch 13, for these ears are usually cast and roughly finished and accordingly are not of any standard size. The taper permits the fit without any wobble or twist of the member 18 with relation to the ear. The outer face of the member 18 is provided with the ratchet teeth and these are arranged upon a circle of greater diameter than the external diameter of the shaft 14. Inwardly of the teeth, the outer face is countersunk, as at 33, so that it partially receives a washer 34 having a tongue 35 by engagement of which in the keyway 17, the washer is held against rotation with relation to the shaft. The member 19 is in the form of a nut, the threaded opening 36 of which is set to one side of the longitudinal center so as to provide space for the formation of the slot 21.

It will be understood that the spring 15, since it constantly exerts a pressure to force the ear 12 toward this nut, will constantly maintain the washer 34 in engagement with the nut and so provide frictional resistance to rotation of the nut with relation to the shaft. As the shaft is oscillated and while the oscillations remain normal, the nut will simply rock with the shaft and no operation thereof will be had. When, however, the movement of the shaft 14 becomes abnormal as, for example, when the band 10 stretches or the brake lining 37 thereof becomes worn, the ratchet lug 28 will pass over a ratchet tooth 20 and when the shaft returns to its normal position, the nut will remain stationary, thus advancing the nut on the shaft 14 and decreasing the distance through which the ear 12 may move.

Since the construction hereinbefore set forth is capable of a certain range of change and modification without materially departing from the spirit of the invention, I do not limit myself to such specific structure except as hereinafter claimed.

I claim:—

1. In combination with a flexible brake band and a drum associated therewith and a rock shaft for tensioning the band upon the drum, the band having a slotted ear through which the rock shaft is directed, a member rotatably mounted upon the shaft and having an extension engaging in the slot of the ear whereby it is held against rotation upon the shaft, a second member threaded upon the shaft, one of the confronting faces of said members being provided with an annular rack, the other of said confronting faces being formed with a chordally directed slot, an L-shaped member pivoted at the end of one of the arms thereof within said slot and having the other of the arms thereof directed toward the inner end wall of the slot, a U-shaped spring arranged between said L-shaped member and the inner wall of the slot and constantly urging the L-shaped member outwardly the exterior angle of the arms of the L-shaped member being provided with a ratchet lug for engagement in the teeth of said ratchet rack.

2. In combination with a flexible brake band and a drum associated therewith and a rock shaft for tensioning the band upon the drum, the band having a slotted ear through which the rock shaft is directed, a member rotatably mounted upon the shaft and having an extension engaging in the slot of the ear whereby it is held against rotation upon the shaft, a second member threaded upon the shaft, one of the confronting faces of said members being provided with an annular rack, the other of said confronting faces being formed with a chordally directed slot, an L-shaped member pivoted at the end of one of the arms thereof within said slot and having the other of the arms thereof directed toward the inner end wall of the slot, a U-shaped spring arranged between said L-shaped member and the inner wall of the slot and constantly urging the L-shaped member outwardly, the exterior angle of the arms of the L-shaped member being provided with a ratchet lug for engagement in the teeth of said ratchet rack, a washer splined to the shaft intermediate said members and a spring constantly urging the ear longitudinally of the shaft toward the threaded member whereby said washer abuts the threaded member to frictionally resist rotation thereof.

3. In combination with a flexible brake band and a drum associated therewith and a rock shaft for tensioning the band upon the drum, the band having a slotted ear through which the rock shaft is directed, a member rotatably mounted upon the shaft and having an extension engaging in the slot of the ear whereby it is held against rotation upon the shaft, a second member threaded upon the shaft, one of the confronting faces of said members being provided with an annular rack, the other of said confronting faces being formed with a chordally directed slot, an L-shaped member pivoted at the end of one of the arms thereof within said slot and having the other of the arms thereof directed toward the inner end wall of the slot, a U-shaped spring arranged between said L-shaped member and the inner wall of the slot and constantly urging the L-shaped member outwardly, the exterior angle of the arms of the L-shaped member being provided with a ratchet lug for engagement in the teeth of said ratchet rack, said extension of the first named member having its side faces flat and converging toward the free end of the extension.

In testimony whereof I hereunto affix my signature.

ERLE D. WORDEN.